United States Patent
Nishimura et al.

(10) Patent No.: US 7,839,389 B2
(45) Date of Patent: Nov. 23, 2010

(54) INFORMATION PROCESSING EQUIPMENT AND METHOD FOR DETERMINING THE PRIORITY OF INPUT KEYS THEREOF

(75) Inventors: Satoshi Nishimura, Tokyo (JP); Masahiro Yamagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 862 days.

(21) Appl. No.: 11/525,588

(22) Filed: Sep. 22, 2006

(65) Prior Publication Data
US 2007/0073692 A1 Mar. 29, 2007

(30) Foreign Application Priority Data
Sep. 29, 2005 (JP) .............................. 2005-285609

(51) Int. Cl.
*G09G 5/00* (2006.01)
(52) U.S. Cl. ...................................... 345/169
(58) Field of Classification Search ................. 345/168, 345/169, 172; 455/425; 707/7; 341/22
See application file for complete search history.

(56) References Cited

U.S. PATENT DOCUMENTS

| | | | | |
|---|---|---|---|---|
| 4,817,010 A | * | 3/1989 | Dobbins ..................... 700/232 |
| 5,442,346 A | * | 8/1995 | Kim ....................... 340/825.57 |
| 5,734,928 A | * | 3/1998 | Nakasuji ....................... 710/67 |
| 5,793,312 A | * | 8/1998 | Tsubai ......................... 341/22 |
| 5,897,228 A | * | 4/1999 | Schrock ....................... 396/297 |
| 5,915,111 A | * | 6/1999 | Ouchi ......................... 718/107 |
| 6,085,204 A | * | 7/2000 | Chijiwa et al. .............. 715/246 |
| 7,535,459 B2 | * | 5/2009 | You et al. ................... 345/169 |
| 2005/0140653 A1 | * | 6/2005 | Pletikosa et al. ............ 345/168 |
| 2006/0119581 A1 | * | 6/2006 | Levy .......................... 345/168 |

FOREIGN PATENT DOCUMENTS

| JP | UM-B-1-024659 | 7/1989 |
|---|---|---|
| JP | 2002-91671 A | 3/2002 |

* cited by examiner

*Primary Examiner*—Richard Hjerpe
*Assistant Examiner*—Tom V Sheng
(74) *Attorney, Agent, or Firm*—Holtz, Holtz, Goodman & Chick, PC

(57) ABSTRACT

Information processing equipment which changes the priority for operations executed in response to simultaneous manipulation of multiple keys in accordance with the operational stage in an application wherein the simultaneous manipulation is performed. Thus, an operation more suitable for the operational stage can be performed even if a user simultaneously manipulates multiple keys by mistake.

7 Claims, 7 Drawing Sheets

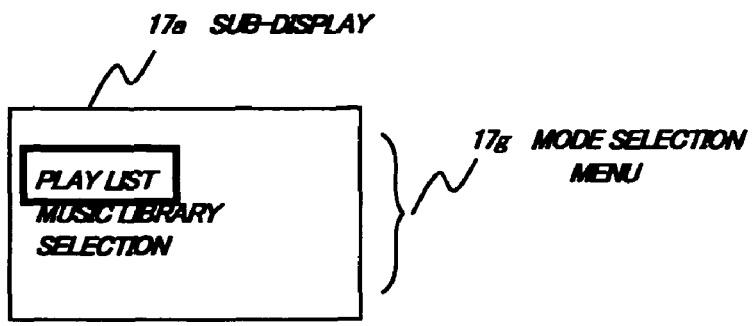
FIG. 6
| PRIORITIZED KEY | SIMULTANEOUSLY INPUT KEYS |
|---|---|
| NEXT/FAST FORWARD KEY | MODE SWITCH KEY + NEXT/FAST FORWARD KEY |
| RETURN/REWIND KEY | MODE SWITCH KEY + RETURN/REWIND KEY |
| ⋮ | ⋮ |
21a KEY PRIORITY INFORMATION AT MODE SELECTION
21b
21c
FIG. 7
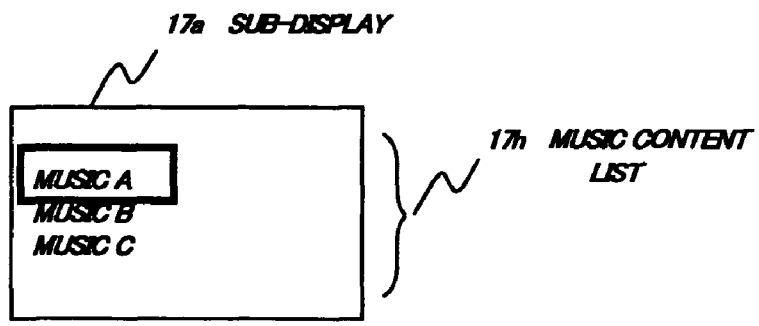
FIG. 8

21d  KEY PRIORITY INFORMATION AT REPLAY

| PRIORITIZED KEY (21e) | SIMULTANEOUSLY INPUT KEYS (21f) |
|---|---|
| N/FF KEY (LONG PRESSED) | MODE SWITCH KEY + NEXT/FAST FORWARD KEY |
| MODE SWITCH KEY | MODE SWITCH KEY + RETURN/REWIND KEY |
| MODE SWITCH KEY | NEXT/FAST FORWARD KEY + RETURN/REWIND KEY |
| ⋮ | ⋮ |

FIG. 9

21g  LONG PRESSED KEY PRIORITY INFORMATION AT REPLAY

| PRIORITIZED KEY (21h) | SIMULTANEOUSLY INPUT KEYS (21i) |
|---|---|
| NEXT/FAST FORWARD KEY | MODE SWITCH KEY + NEXT/FAST FORWARD KEY |
| RETURN/REWIND KEY | MODE SWITCH KEY + RETURN/REWIND KEY |
| NEXT/FAST FORWARD KEY | NEXT/FAST FORWARD KEY + REPLAY/PAUSE KEY |
| RETURN/REWIND BUTTON | RETURN/REWIND KEY + REPLAY/PAUSE KEY |
| NEXT/FAST FORWARD KEY | NEXT/FAST FORWARD KEY + RETURN/REWIND KEY |
| REPLAY/PAUSE KEY | MODE SWITCH KEY + NEXT/FAST FORWARD KEY + RETURN/REWIND KEY + REPLAY/PAUSE KEY |
| ⋮ | ⋮ |

FIG. 10

INFORMATION PROCESSING EQUIPMENT AND METHOD FOR DETERMINING THE PRIORITY OF INPUT KEYS THEREOF

CROSS-REFERENCE TO RELATED APPLICATIONS

This application is based upon and claims the benefit of priority from the prior Japanese Patent Application No. 2005-285609, filed on Sep. 29, 2005; the entire contents of which are incorporated herein by reference.

BACKGROUND OF THE INVENTION

1. Field of the Invention

The present invention relates to information processing equipment, and more particularly to information processing equipment which can determine a user's intended operation when a plurality of keys are manipulated at a same time based on whether the plurality of keys are long pressed or short pressed, wherein the keys are used to control the operation of various functions of the information processing equipment.

2. Description of the Related Art

There have been small-sized information processing equipments which store a plurality of contents data for replay such as music contents. The music contents are coded music information and may include coded speech information, coded image information, etc. The information processing equipment is not limited to units exclusive for use in music replay. For example, the unit may be an information processing equipment with a music replay function.

The music replay function in the small-sized information processing equipment is usually controlled by manipulating small-sized keys to select items from multiple menus. A user of the unit might accidentally input multiple keys at the same time. Then, a process is known in which priority is assigned to individual keys and a key with the highest priority is assumed to be input when multiple keys are input at the same time while a predetermined application is being operated (for example, see Patent Reference 1).

The keys are electrical switches that are input depending on being pressed down but not limited thereto. They may be a touch panel, namely, a switch that is manipulated by finger touch. Simultaneous manipulation may occur with the touch panel when a position is touched between the positions that are defined to touch in correspondence with multiple switches.

Patent Reference 1: JP-UM-B-1-24659 (page 1, FIG. 3)

When the conditions in operation are changed by tracking multiple menus during the operation of one application, it is demanded to change the key that is assumed as it has been input among keys input the same time.

However, the method described in Patent Reference 1 has a problem that cannot cope with changing the key that is assumed as it has been input among the keys input at the same time depending on the conditions in operation. The problem is the same in information processing other than music replay.

BRIEF SUMMARY OF THE INVENTION

The present invention has been accomplished to solve the above-described problems. The object of the present invention is to provide information processing equipment which changes the priority for operations executed in response to simultaneous manipulation of multiple keys in accordance with the operational stage in an application wherein the simultaneous manipulation is performed.

To achieve this object, an aspect of the present invention is information processing equipment comprises an input unit having multiple keys, the unit which outputs multiple key identifiers when the multiple keys are simultaneously manipulated, and a processor which executes an operation in response to a key identifier predetermined in accordance with both a combination of the multiple key identifiers output through the simultaneous manipulation and an operation being executed by the processor when the multiple key identifiers are output at the simultaneous manipulation.

Another aspect of the present invention is information processing equipment comprises an input unit having multiple keys, the unit which outputs multiple key identifiers when the multiple keys are simultaneously manipulated, a processor which executes an operation in response to the output multiple key identifiers, and a memory which stores a key identifier predetermined in accordance with a combination of multiple key identifiers in association with an operation which the processor executes. The processor executes an operation in response to the key identifier predetermined in accordance with both a combination of the multiple key identifiers output through the simultaneous manipulation and an operation being executed by the processor when the multiple key identifiers are output at the simultaneous manipulation.

According to these aspects of the present invention, the information processing equipment can be provided which changes the priority for operations executed in response to simultaneous manipulation of multiple keys in accordance with the operational stage in an application wherein the simultaneous manipulation is performed. Thus, an operation more suitable for the operational stage can be performed even if a user simultaneously manipulates multiple keys by mistake.

BRIEF DESCRIPTION OF SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is an exemplary mode selection menu displayed by a music replay section of the information processing equipment shown in FIG. 1;

FIG. 7 is exemplary key priority information at mode selection displayed by a music replay section of the information processing equipment shown in FIG. 1;

FIG. 8 is an exemplary music content list displayed by a music replay section of the information processing equipment shown in FIG. 1;

FIG. 9 is exemplary key priority information at replay displayed by a music replay section of the information processing equipment shown in FIG. 1; and FIG. 10 is exemplary long pressed key priority information at replay displayed by a music replay section of the information processing equipment shown in FIG. 1.

DETAILED DESCRIPTION OF THE INVENTION

An embodiment of the present invention will be explained below with reference to the accompanying drawings.

Figure 1:
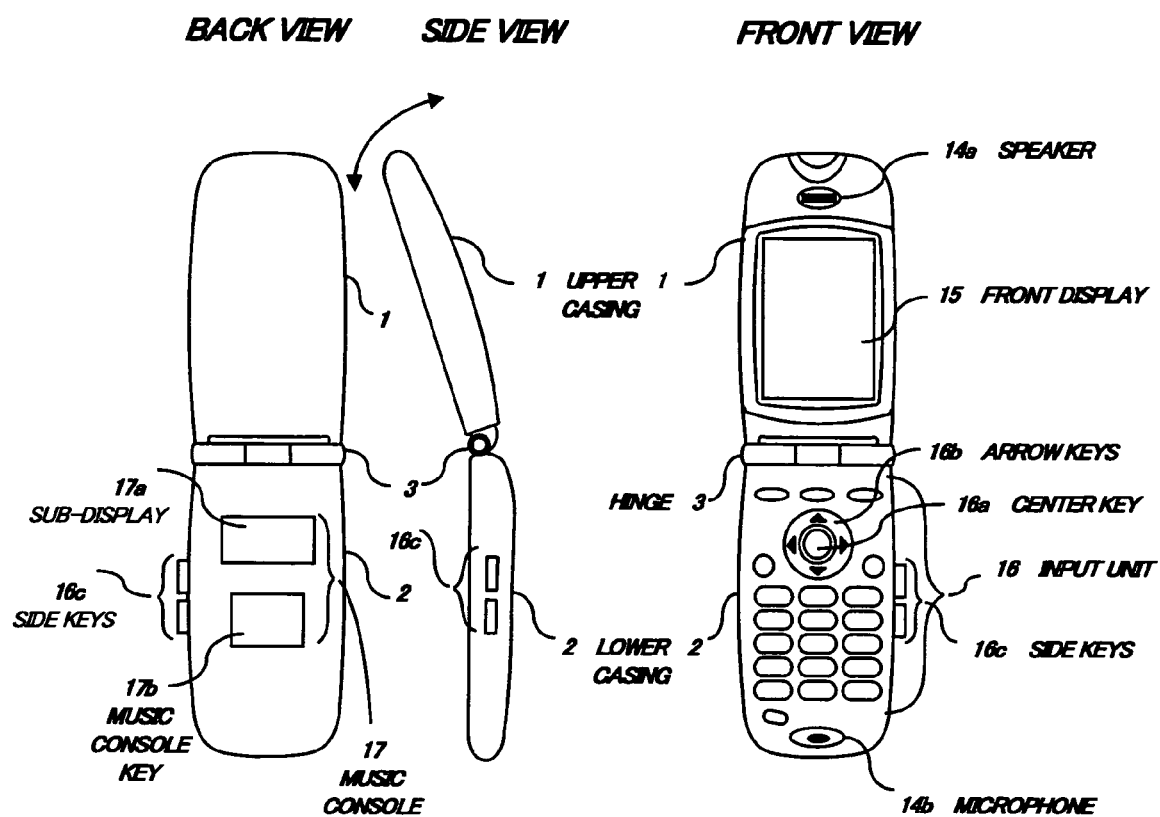
FIG. 1 is an appearance diagram showing a main configuration of information processing equipment with the upper and lower casings unfolded according to an embodiment of the present invention.

FIG. 1 is an appearance diagram showing a main configuration of information processing equipment with the upper and lower casings unfolded according to an embodiment of the present invention. The equipment may be a mobile communication terminal device which replays music. FIG. 1 comprises a back view, a side view and a front view. In the information processing equipment, the upper casing 1 and the lower casing 2 are rotatably connected to each other with a hinge 3.

On the inner surface of the upper casing 1, a speaker 14a is disposed which is used for receiving speech, and a front display 15 formed of an LCD (Liquid Crystal Display) with a backlight is disposed which is used for display to encourage a user to operate, and to show the descriptions of manipulations done by the user, a cursor position, and the operational state of the equipment.

In addition, on the inner surface of the lower casing 2, a microphone 14b is disposed which is used for talk. On the inner surface and the side surface of the lower casing 2, an input unit 16 formed of keypads is disposed. Moreover, the inner surface of the lower casing 2, an antenna (not shown) is disposed which is used for sending and receiving radio waves.

Furthermore, on the outer surface of the lower casing 2, a music console 17 is disposed. The music console 17 has a sub-display 17a formed of an LCD (Liquid Crystal Display) with a backlight which is used for display to encourage a user to operate regarding music replay, and to show the descriptions of manipulations done by the user, a cursor position, and the operational state of the equipment, and has a music console key 17b which is used for entering operation instructions regarding music replay.

The input unit 16 is disposed on the inner surface of the lower casing 2, and includes a center key 16a which is used for instructing acceptance and selection in each function, and arrow keys 16b which are placed adjacently to the center key 16a to surround the center key 16a, and used for instructing the cursor position to move on the front display 15.

Furthermore, the input unit 16 includes numeric keys which are used for entering alphanumeric characters, letters, and symbols; multiple function keys which are used for entering operation instructions such as turning power on and off the information processing equipment; and multiple side keys 16c which are placed on the side surface of the lower casing 2.

Moreover, on the hinge 3, an unfolded/folded detecting section (not shown) is disposed which detects whether the upper and lower casings 1 and 2 are unfolded or folded, and an unfolded/folded signal is output from the unfolded/folded detecting section.

Figure 2:
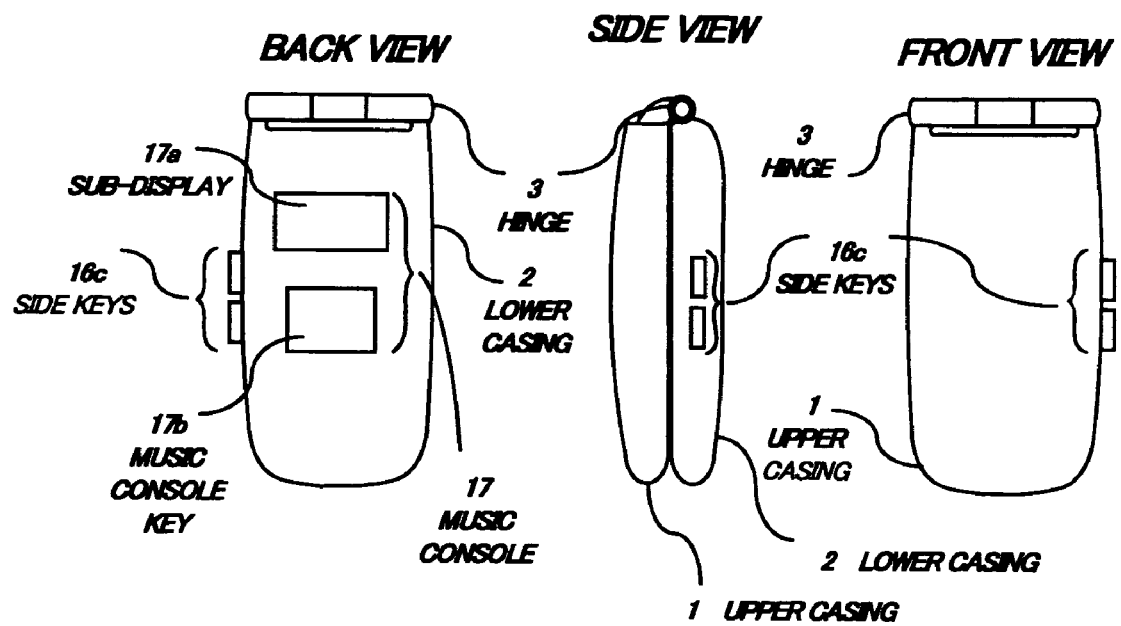
FIG. 2 is an appearance diagram showing the information processing equipment shown in FIG. 1 with the upper and lower casings folded.

FIG. 2 is an appearance diagram showing the information processing equipment with the upper and lower casings folded. FIG. 2 comprises a back view, a side view and a front view similarly to FIG. 1. In the state that the upper and lower casings 1 and 2 are folded, indications on the front display 15 placed on the inner surface of the upper casing 1 cannot be visibly recognized, and the keys of the input unit 16 arranged on the inner surface of the lower casing 2 cannot be manipulated.

Figure 3:
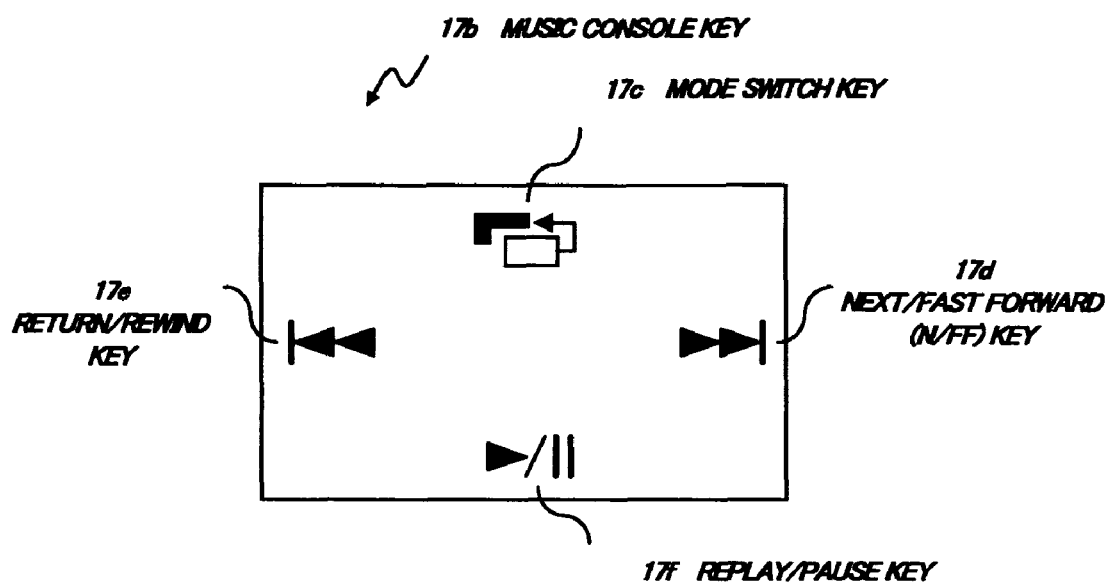
FIG. 3 is an appearance diagram showing a music console key of the information processing equipment shown in FIG. 1.

FIG. 3 is an appearance diagram showing a music console key of the information processing equipment. The music console key 17b is formed of an almost rectangular flexible plate material hardly damaged, on which two rectangles are depicted at the center part near the upper part and an arrow that connects the rectangles is depicted, which indicate a mode switch key 17c. Here, the rectangles symbolize selection operations by menus.

Furthermore, the two rightward arrows are depicted at the center part near the right part, which indicate a next/fast forward key 17d. Moreover, two leftward arrows are depicted at the center part near the left part, which indicate a return/rewind key 17e. Moreover, a single rightward arrow and two vertical bars are depicted at the center part near the lower part, which indicate a replay/pause key 17f.

Here, the rightward arrows represent the operation in the replay direction. A single rightward arrow symbolizes the replay operation, and two rightward arrows symbolize the fast forward operation. Furthermore, a single leftward arrow represents the operation in the reverse direction to the replay direction, and two leftward arrows symbolize the rewind operation. Moreover, the vertical bars symbolize stopping replay.

In addition, the mode switch key 17c is sometimes used as a key to move the cursor up, and the replay/pause key 17f is sometimes used as a key to move the cursor below. Furthermore, the next/fast forward key 17d is sometimes used as a key to select an item represented by a line on which the cursor is placed, and the return/rewind key 17e is sometimes used as a key to return to the menu one stage above.

Below each of the keys 17c to 17f, an electrical switch (not shown) is disposed. A certain switch is conducted to detect that a key corresponding to that switch has been pressed down. Furthermore, a certain switch is not conducted to detect that a key corresponding to that switch is not pressed down. Then, the keys 17c to 17f have the same functions as keys.

Here, only a single key among the keys 17c to 17f is not always pressed down. Two adjacent keys among the keys 17c to 17f are sometimes pressed down at the same time. In addition to this, since the music console key 17b is formed of a flexible plate material, two or three given keys might be pressed down at the same time, and all four keys might be pressed down at the same time.

Figure 4:
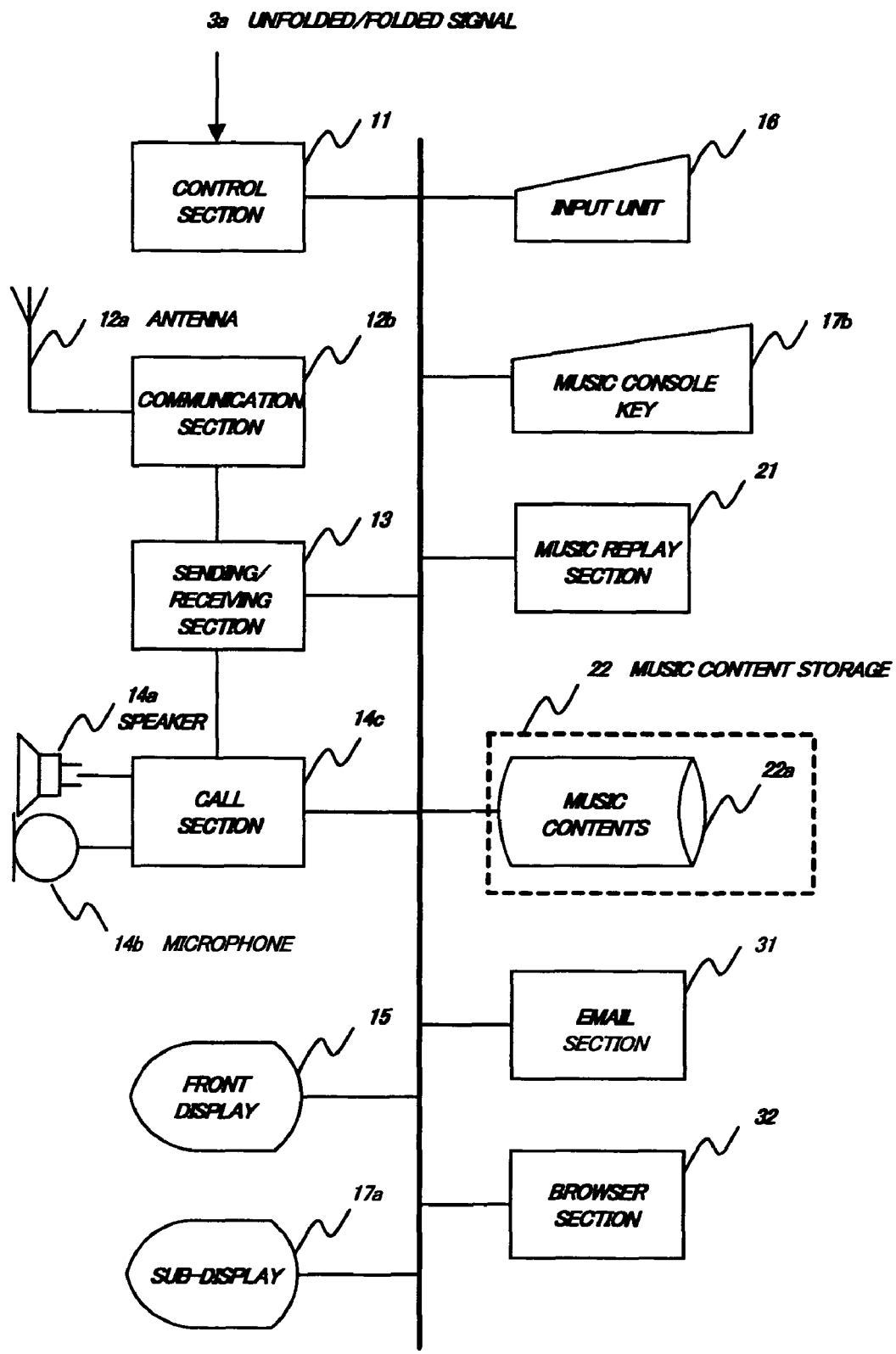
FIG. 4 is a block diagram showing the information processing equipment shown in FIG. 1.

FIG. 4 is a block diagram showing the information processing equipment. The information processing equipment is formed of a control section 11 to which an unfolded/folded signal 3a is input to control the device overall, an antenna 12a which sends and receives radio waves with a base station (not shown), a communication section 12b, a sending/receiving section 13, the speaker 14a for receiving speech and for music replay, the microphone 14b for talk, a call section 14c, the front display 15, the sub-display 17a, the input unit 16, the music console key 17b, a music replay section 21, a music content storage 22, an email sending/receiving section 31 which sends and receives email, and a browser section 32 which makes access to web pages.

The music content storage 22 is stored with a single or multiple music contents 22a. The music contents 22a stored in the music content storage 22 are information that speech information is coded. Then, the music contents 22a are those received as an attached file received by the email sending/receiving section 31, and those downloaded by the browser section 32, but not limited thereto.

In addition, the music contents 22a may include information that image information is coded other than information that speech information is coded. Furthermore, they may include character information about the music contents 22a.

The operation of each part of the information processing equipment of the embodiment according to the invention thus configured will be described with reference to FIG. 4.

The communication section 12b outputs a high frequency signal received at the antenna 12a to the sending/receiving section 13, and sends a high frequency signal output at the sending/receiving section 13 from the antenna 12a.

The sending/receiving section 13 amplifies, frequency converts, and demodulates the high frequency signal from the communication section 12b, and sends a digital speech signal thus obtained to the call section 14c, and sends a control signal to the control section 11. Furthermore, it modulates, frequency converts, and amplifies the digital speech signal output from the call section 14c, and the control signal output from the control section 11, obtains a high frequency signal, and sends it to the communication section 12b.

The call section 14c converts and amplifies the digital speech signal output from the sending/receiving section 13 to an analog speech signal, and sends it to the speaker 14a. Moreover, it amplifies and converts an analog speech signal output from the microphone 14b to a digital speech signal, and sends it to the sending/receiving section 13.

The front display 15 is controlled by the control section 11 to display characters, numerics and image data when it is detected with the unfolded/folded signal 3a that the upper and lower casings 1 and 2 are unfolded. The displayed data is switched by receiving an instruction from the control section 11 in response to input manipulation from the input unit 16 and an incoming signal.

The sub-display 17a is controlled by the control section 11 to display characters, numerics and image data when it is detected with the unfolded/folded signal 3a that the upper and lower casings 1 and 2 are folded. The displayed data is switched by receiving an instruction from the control section 11 in response to input manipulation from the music console key 17b and an incoming signal.

The input unit 16 is formed of keys including numeric keys which specify a telephone number of a person to communicate and of multiple function keys. Then, when a key on the input unit 16 is manipulated, the key's identifier is notified to the control section 11, and the control section 11 allows the front display 15 to display it as a character, or performs control.

When a given number of the keys are manipulated among four the keys 17c to 17f of the music console key 17b, the identifiers of all the keys having been manipulated are notified to the music replay section 21 through the control section 11. Moreover, the control section 11 notifies the music replay section 21 that it is a short press in addition to the key's identifier when the manipulation is done within a predetermined time period, and it notifies the music replay section 21 that it is a long press in addition to the key's identifier when the manipulation is done over a predetermined time period.

The music replay section 21 displays a list of the music contents 22a on the front display 15 or the sub-display 17a. Then, when a predetermined key of the input unit 16 or the music console key 17b is input, a single or multiple music contents 22a are selected from the list, and the selected music content 22a is replayed.

Figure 5:
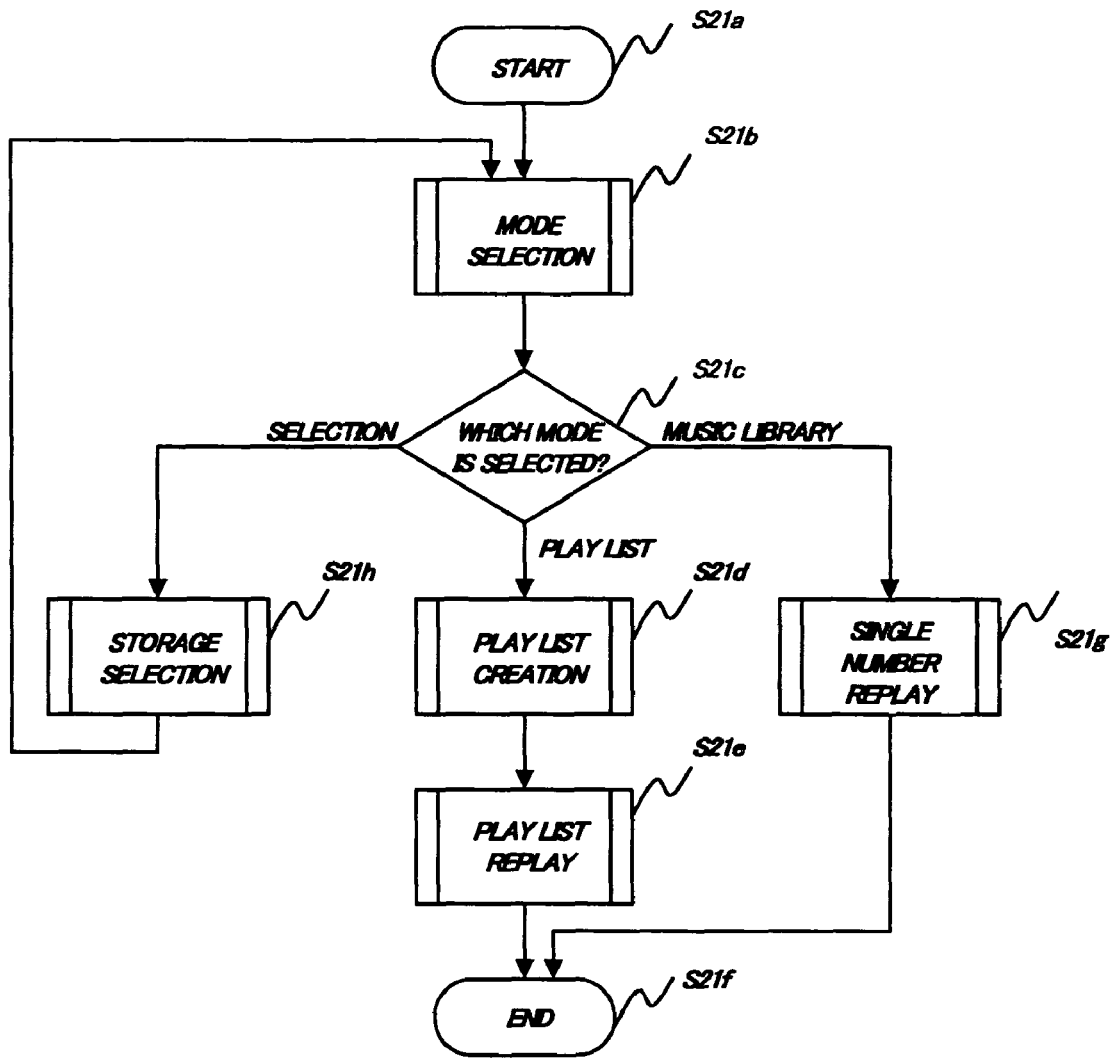
FIG. 5 is a flowchart showing the music replay operation controlled by a music replay section of the information processing equipment shown in FIG. 1.

Hereinafter, a music replay control operation using the music console key 17b of the information processing equipment according to the embodiment will be described. FIG. 5 is a flow chart illustrating the music replay control operation using the music console key 17b of the music replay section 21.

When a predetermined function key of the input unit 16 disposed on the inner surface of the lower casing 2 is manipulated in the state that the upper and lower casings 1 and 2 are unfolded, the control section 11 is activated to start the operation of the music replay section 21. After the upper and lower casings 1 and 2 are folded, the control operation of music replay done by the keys 17c to 17f of the music console key 17b is started (step S21a).

Furthermore, when a predetermined side key 16c disposed on the side surface of the lower casing 2 is input in the state that the upper and lower casings 1 and 2 are folded, the control section 11 is activated to start the operation of the music replay section 21. The control operation of music replay done by the keys 17c to 17f of the music console key 17b is started (step S21a).

Subsequently, the music replay section 21 performs a mode selection operation (step S21b). More specifically, it displays a mode selection menu formed of a mode list of the sub-display 17a. FIG. 6 shows an exemplary mode selection menu. In this mode selection menu 17g, characters are shown that indicate three modes, "PLAY LIST", "MUSIC LIBRARY" and "SELECTION" in three lines.

Then, the cursor is placed on one line among the three lines, and that line is displayed in the form different from others. In the initial state that the mode selection menu 17g is displayed, the cursor is placed on the "PLAY LIST" at the first line. In addition, for different display forms, there are indications in different colors, and indications flashed, but not limited thereto. It is fine as long as a line can be distinguished from the other lines. In the example shown in FIG. 6, characters "PLAY LIST" are shaded to indicate that the cursor is placed on the characters "PLAY LIST".

Here, when the mode switch key 17c is input, the music replay section 21 moves the line on which the cursor is placed to a line above. Moreover, when the replay/pause key 17f is input, it moves the line on which the cursor is placed to a line below.

Furthermore, when the next/fast forward key 17d is input, the music replay section 21 selects the mode indicated by the line on which the cursor is placed. When the return/rewind key 17e is input, the music replay section 21 ends the operation.

When keys are input at the same time during the mode selection operation at step S21b, that is, multiple keys are pressed down at the same time, the music replay section 21 prioritizes a particular key, and assumes that that particular key has been input in accordance with key priority information at mode selection stored in the music replay section 21. Then, it performs the control operation at the time when that particular key has been input. FIG. 7 shows exemplary key priority information at mode selection. The key priority information at mode selection 21a is formed of a set of information associating a prioritized key 21b with simultaneous input keys 21c.

Then, the next/fast forward key as the prioritized key 21b is associated with the mode switch key+next/fast forward key as the simultaneous input keys 21c for storage. It is stored that the next/fast forward key 17d is assumed as it has been input when the mode switch key 17c and the next/fast forward key 17d are input at the same time.

Furthermore, the return/rewind key as the prioritized key 21b is associated with the mode switch key+return/rewind key as the simultaneous input keys 21c for storage. It is stored that the return/rewind key 17e is assumed as it has been input when the mode switch key 17c and the return/rewind key 17e are input at the same time.

In the process that the mode switch key 17c is not prioritized, since the cursor is placed on the "PLAY LIST" at the first line in the initial state that the mode selection menu 17g is displayed, the mode switch key 17c does not need to be input. When multiple keys including the mode switch key 17c are input at the same time, it is proper to ignore the input of the mode switch key 17c not required.

The music replay section 21 branches the operation depending on the selected mode at step S21b (step S21c). When the "PLAY LIST" is selected as a mode, the music replay section 21 replays the music contents 22a in accordance with a play list, that is, the list of the identifiers of the multiple music contents 22a in this order, and thus it first creates a play list (step S21d).

More specifically, the list of the music contents 22a stored in the music content storage 22 is displayed on the sub-display 17a. FIG. 8 shows an exemplary music content list. The music content list 17h is formed of multiple lines. A single line represents information that identifies the music content 22a, for example, it represents a name of the music content 22a. In the example shown in FIG. 7, it indicates that music contents 22a named by "music A", "music B" and "music C" are stored in the music content storage 22.

Then, the cursor is placed on one line among the three lines, and that line is indicated in the form different from the others. In the initial state that the music content list 17h is indicated, the cursor is placed at the first line (in the example shown in FIG. 8, on "music A"). In addition, for different display forms, there are indications in different colors, and indications flashed, but not limited thereto. It is fine as long as a line can be distinguished from the other lines. In the example shown in FIG. 8, characters "music A" are shaded to indicate that the cursor is placed on the line of characters "music A".

Here, when the mode switch key 17c is input, the music replay section 21 moves the line to which the cursor is placed one line above. Furthermore, when the replay/pause key 17f is input, it moves the line to which the cursor is placed one line below.

In addition, when many music contents 22a are stored in the music content storage 22, information that identifies all the music contents 22a might not be shown on the sub-display 17a. In this case, the music replay section 21 shows information that identifies a part of the music contents 22a, and the information that identifies the music contents 22a shown is scrolled in accordance with the manipulation of the mode switch key 17c and the replay/pause key 17f.

Furthermore, the next/fast forward key 17d is manipulated, the music replay section 21 adds the identifier of a music content 22a indicated by the line on which the cursor is placed to the end of the play list. When the play list is empty, a play list formed of that identifier is created.

In this manner, when the mode switch key 17c, the replay/pause key 17f, and the next/fast forward key 17d are used to create the play list and the return/rewind key 17e is then input, the music replay section 21 ends the creation of the play list. Then, a play list replay operation by the created play list, that is, the operation is done in which the music contents 22a whose identifiers are stored in the play list are replayed in order of being stored (step S21e). More specifically, the music contents 22a are read from the music content storage 22, and coded them, and music is played from the speaker 14a to end the control operation (step S21f).

In the play list replay operation at step S21e, the music replay section 21 displays the list of information that identifies the music contents 22a stored in the play list on the sub-display 17a, and displays information that identifies the music content 22a being replayed in the display form different from information that identifies the others.

In the play list replay operation at step S21e, one key is input among the keys 17c to 17f of the music console key 17b, and then the music replay section 21 performs the control operation below. More specifically, when the Mode switch key 17c is input, the music replay section 21 performs the control operation of mode selection at step S21b while it continues the play list replay operation (not shown). Then, subsequently to the mode selection, the play list replay operation continued is finished before the play list replay operation at step S21e or the operation of replaying a single number at step S21g, described later.

When the next/fast forward key 17d is manipulated for a short time, the music replay section 21 finishes the replay of a music content 22a being replayed, and replays a music content 22a that is identified by the identifier stored next to the identifier of the music content 22a being replayed in the play list. When the next/fast forward key 17d is manipulated for a long time, the music replay section 21 fast forwards the music content 22a being replayed.

When the return/rewind key 17e is manipulated for a short time, the music replay section 21 finishes the replay of the music content 22a being replayed, and replays a music content 22a that is identified by the identifier stored before the identifier of the music content 22a being replayed in the play list. When the return/rewind key 17e is manipulated for a long time, the music replay section 21 rewinds the music content 22a being replayed.

When the replay/pause key 17f is manipulated for a short time, the music replay section 21 pauses the replay of the music content 22a being replayed. In the case where replay is paused, when the replay/pause key 17f is manipulated for a short time, the music replay section 21 restarts the replay of the paused music content 22a. When the replay/pause key 17f is manipulated for a long time, the music replay section 21 finishes the replay of the music content 22a, finishes display on the sub-display 17a, and ends the control operation (not shown).

In the play list replay operation at step S21e, multiple keys among the keys 17c to 17f of the music console key 17b are input at the same time, and then the music replay section 21 prioritizes a particular key and assumes that that particular key has been input in accordance with short press key priority information at replay and long press key priority information at replay stored in the music replay section 21. Then, it performs the control operation at the time when that particular key has been input. FIG. 9 shows exemplary short press key priority information at replay. The short press key priority information at replay 21d is formed of a set of information associating a prioritized key 21e with simultaneous input keys 21f.

Then, a long press of the next/fast forward key as the prioritized key 21e is associated with the mode switch key+next/fast forward key as the simultaneous input keys 21f for storage. It is stored that the next/fast forward key 17d is assumed as it has been manipulated for a long time when the mode switch key 17c and the next/fast forward key 17d are manipulated for a short time at the same time. By the stored correspondence, a fast forward process is prioritized than the process of new mode selection.

Furthermore, the mode switch key as the prioritized key 21e is associated with the mode switch key+return/rewind key as the simultaneous input keys 21f for storage. It is stored that the mode switch key 17c is assumed as it has been manipulated for a short time when the mode switch key 17c and the return/rewind key 17e are manipulated for a short time at the same time. By the stored correspondence, a new mode selection process is prioritized than the process of replaying the music content 22a stored before the music content 22a being replayed in the play list.

Moreover, the mode switch key as the prioritized key 21e is associated with the next/fast forward key+return/rewind key as the simultaneous input keys 21f for storage. It is stored that the mode switch key 17c is assumed as it has been manipulated for a short time when the next/fast forward key 17d and the return/rewind key 17e are manipulated for a short time at the same time. By the stored correspondence, a new mode selection process is prioritized when manipulation of replay is done in the opposite direction.

FIG. 10 shows exemplary long press key priority information at replay. The long press key priority information at replay 21g is formed of a set of information associating a prioritized key 21h with simultaneous input keys 21i.

Then, the next/fast forward key as the prioritized key 21h is associated with the mode switch key+next/fast forward key as the simultaneous input keys 21i for storage. It is stored that the next/fast forward key 17d is assumed as it has been manipulated for a long time when the mode switch key 17c and the next/fast forward key 17d are pressed for a long time at the same time. By the stored correspondence, a fast forward process, that is, a process of continuing replay is prioritized than the process of new mode selection.

Furthermore, the return/rewind key as the prioritized key 21h is associated with the mode switch key+return/rewind key as the simultaneous manipulation keys 21i for storage. It is stored that the return/rewind key 17e is assumed as it has been manipulated for a long time when the mode switch key 17c and the return/rewind key 17e are pressed for a long time at the same time. By the stored correspondence, a rewind process, that is, a process of continuing replay is prioritized than the process of new mode selection.

Moreover, the next/fast forward key as the prioritized key 21h is associated with the next/fast forward key+replay/pause key as the simultaneous input keys 21i for storage. It is stored that the next/fast forward key 17d is assumed as it has been manipulated for a long time when the next/fast forward key 17d and the replay/pause key 17f are pressed for a long time at the same time. By the stored correspondence, a fast forward process, that is, a process of continuing replay is prioritized than finishing music replay.

Furthermore, the return/rewind key as the prioritized key 21h is associated with the return/rewind key+replay/pause key as the simultaneous manipulation keys 21i for storage. It is stored that the return/rewind key 17e is assumed as it has been manipulated for a long time when the return/rewind key 17e and the replay/pause key 17f are pressed for a long time at the same time. By the stored correspondence, a rewind process is prioritized than a process of finishing music replay.

Moreover, the next/fast forward key as the prioritized key 21h is associated with the next/fast forward key+return/rewind key as the simultaneous input keys 21i for storage. It is stored that the next/fast forward key 17d is assumed as it has been manipulated for a long time when the next/fast forward key 17d and the return/rewind key 17e are pressed for a long time at the same time. By the stored correspondence, when manipulation is done that replays in the opposite directions, a process of replay in the forward direction is prioritized.

Furthermore, the replay/pause key as the prioritized key 21h is associated with the mode switch key+next/fast forward key+return/rewind key+replay/pause key as the simultaneous input keys 21i for storage. It is stored that the replay/pause key 17f is assumed as it has been manipulated for a long time when the mode switch key 17c, the next/fast forward key 17d, the return/rewind key 17e, and the replay/pause key 17f are pressed for a long time at the same time. By the stored correspondence, when manipulation usually impossible is done such as all the keys being manipulated, a process of finishing music replay is prioritized.

When the selected mode is "MUSIC LIBRARY" at step S21c, the music replay section 21 replays one of the music contents 22a stored in the music content storage 22 (step S21g), and it ends the control operation (step S21f).

More specifically, as similar to the case where the "PLAY LIST" is selected, the list of the music contents 22a stored in the music content storage 22 is shown on the sub-display 17a, and the cursor is moved on one among them by the mode switch key 17c and the replay/pause key 17f. When the next/fast forward key 17d is input, the music content 22a indicated by the line on which the cursor is placed is replayed. In addition, when the return/rewind key 17e is input, the music replay section 21 returns to the mode selection operation (not shown).

In the single number replay operation at step S21g, the music replay section 21 shows the name of the music content 22a being replayed on the sub-display 17a.

In the single number replay operation at step S21g, one key among the keys 17c to 17f of the music console key 17b is input, and then the music replay section 21 performs the same control operation as the control operation in the case where one key is input among the keys 17c to 17f of the music console key 17b in the play list replay operation at step S21e. However, since the play list is not set in single number replay, the control operation is not done when the next/fast forward key 17d is manipulated for a short time. Furthermore, when the return/rewind key 17e is manipulated for a short time, the mode selection menu 17g that is a screen right before is shown on the sub-display 17a.

In the single number replay operation at step S21g, multiple keys among the keys 17c to 17f of the music console key 17b are input at the same time, the music replay section 21 performs the same control operation as the control operation in the case where one key is input among the keys 17c to 17f of the music console key 17b in the play list replay operation at step S21e described above, in accordance with the short press key priority information at replay 21d and the long press key priority information at replay 21g stored in the music replay section 21, and a predetermined key is assumed as it has been input.

In the case where the selected mode is "SELECTION" at step S21c, when the music content storage 22 is split into multiple storages, for example, it is split into a storage inside the unit and a removable storage medium, the music replay section 21 shows the list of the storages to be split on the sub-display 17a, it selects one among them as similar to the case where the "MUSIC LIBRARY" is selected (step S21h), and moves to the mode selection operation at step S21b. Then, after that, at step S21d or step S21g, it shows information that identifies the music contents 22a stored in the selected storage.

In the description above, the music replay section 21 outputs decoded music from the speaker 14a which outputs received speeches, but it is not limited thereto. The unit may have a second speaker for music replay (not shown), and the music replay section 21 may output decoded music from the second speaker.

Furthermore, in the description above, the music console key 17b is formed of an almost rectangular flexible plate material, but it is not limited thereto. For example, it may be formed of an almost circular flexible plate material. Moreover, for example, it may be formed of a donut-shaped flexible plate material which does not include the center part.

Furthermore, electrical switches are placed below the keys 17c to 17f of the music console key 17b, and the switches are conducted to detect whether the keys 17c to 17f are input, but it is not limited thereto. For example, the music console key 17b may be formed of an almost rectangular touch panel, and it may be detected whether any one of four keys is input depending on a finger touching near four sides of that rectangle.

Moreover, when it is detected that a finger touches the position at the nearly equal distance from two adjacent sides, it is determined that keys corresponding to these two sides have been input at the same time. Furthermore, when it is detected that a finger touches the center part of that almost rectangle, it is determined that all the four keys have been input at the same time. Here, the touch panel may be a touch screen. Moreover, it may be a pressure-sensitive type, or may be an electrostatic type.

In addition, in the description above, the music contents 22a are coded speech information, but it is not limited thereto. When the music contents 22a include coded video information, the music replay section 21 decodes coded video information, and shows them on the sub-display 17a in replay of the music contents 22a. Furthermore, when the music contents 22a include character information, the music replay section 21 shows the character information on the sub-display 17a in replay of the music contents 22a.

Moreover, in the description above, the music console key 17b is disposed on the lower casing 2, but it is not limited thereto. It may be disposed on the upper casing 1. Furthermore, the information processing equipment may have headphones for music replay (not shown) connected to the upper casing 1 or the lower casing 2 with a signal line cable, and the music console key 17b may be disposed on the midway of that cable. Moreover, the music console key 17b may communicate with the information processing equipment with radio in a short-range radio communication mode, for example, infrared rays.

Furthermore, in the description above, the key priority information at mode selection 21a, the short press key priority information at replay 21d, and the long press key priority information at replay 21g are stored in the music replay section 21 in the table form, but they are not limited thereto. For example, when the music replay section 21 performs the control operation by a program, the information may be incorporated in that program.

Moreover, in the description above, the example is taken and described in the form that the invention is adapted to a information processing equipment which replays music, but the invention of course can be adapted to any given devices that replay music such as a device exclusive for use in music replay, a PDA (Personal Digital Assistant), and a personal computer. Besides, the invention can be adapted to devices having functions in addition to the function of music replay. The invention is not limited to the configurations above, which can be modified variously.

What is claimed is:

1. Information processing equipment, comprising:
   an input unit having multiple keys, wherein the input unit outputs multiple key identifiers when a plurality of the multiple keys are simultaneously manipulated, and wherein the input unit outputs the multiple key identifiers along with press time information indicating whether the multiple keys are short pressed or long pressed when the multiple keys are simultaneously manipulated; and
   a processor for executing an operation in response to a key identifier predetermined in accordance with both: (i) the multiple key identifiers and the press time information output in response to the simultaneous manipulation and (ii) an operation being executed by the processor when the multiple key identifiers are output in response to the simultaneous manipulation.

2. The equipment of claim 1, wherein the predetermined key identifier corresponds to one of the plurality of simultaneously manipulated keys.

3. Information processing equipment, comprising:
   an input unit having multiple keys, wherein the input unit outputs multiple key identifiers when a plurality of the multiple keys are simultaneously manipulated, and wherein the input unit outputs the multiple key identifiers along with press time information indicating whether the multiple keys are short pressed or long pressed when the multiple keys are simultaneously manipulated;
   a processor for executing an operation in response to a key identifier predetermined in accordance with both: (i) the multiple key identifiers and the press time information output in response to the simultaneous manipulation and (ii) an operation being executed by the processor when the multiple key identifiers are output in response to the simultaneous manipulation; and
   a memory for storing the predetermined key identifier in correspondence with the combination of: (i) the multiple key identifiers and the press time information and (ii) the operation being executed by the processor.

4. The equipment of claim 3, wherein the predetermined key identifier corresponds to one of the plurality of simultaneously manipulated keys.

5. Information processing equipment, comprising:
   an input unit having keys; and
   a processor configured to execute an operation in response to a manipulation of at least one of the keys of the input unit;
   wherein the input unit outputs a first key identifier and a second key identifier when a plurality of the keys are simultaneously depressed; and
   wherein the processor accepts the first key identifier when the plurality of the keys are simultaneously depressed while a first mode is set, and accepts the second key identifier when the plurality of the keys are simultaneously depressed while a second mode is set.

6. The equipment of claim 5, wherein the first mode is a state expressing a selection menu, and the second mode is a state after a selection was made in the first mode.

7. The equipment of claim 5, wherein the second mode is a music playback mode.

* * * * *